US011463754B2

(12) United States Patent
Gaddam et al.

(10) Patent No.: US 11,463,754 B2
(45) Date of Patent: Oct. 4, 2022

(54) PLATFORM FOR APPLIANCE BASED RESOURCE CATALOG

(71) Applicant: VISA INTERNATIONAL SERVICE ASSOCIATION, San Francisco, CA (US)

(72) Inventors: Ajit Gaddam, Foster City, CA (US); Gyan Prakash, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/082,679

(22) PCT Filed: May 3, 2016

(86) PCT No.: PCT/US2016/030554
§ 371 (c)(1),
(2) Date: Sep. 6, 2018

(87) PCT Pub. No.: WO2017/192122
PCT Pub. Date: Nov. 9, 2017

(65) Prior Publication Data
US 2019/0098350 A1     Mar. 28, 2019

(51) Int. Cl.
*H04N 21/254*     (2011.01)
*G06Q 30/02*     (2012.01)
(Continued)

(52) U.S. Cl.
CPC ..... *H04N 21/2541* (2013.01); *G06Q 30/0251* (2013.01); *G06Q 30/0603* (2013.01);
(Continued)

(58) Field of Classification Search
CPC ............. H04N 21/2541; H04N 21/231; H04N 21/6581; H04L 63/0807; H04L 47/826;
(Continued)

(56) References Cited

U.S. PATENT DOCUMENTS 8,868,506 B1    10/2014   Bhargava et al.
10,037,436 B2    7/2018   White
(Continued)

FOREIGN PATENT DOCUMENTS

CN      1371506     9/2002
CN     104657848     5/2015
(Continued)

OTHER PUBLICATIONS

PCT/US2016/030554, "International Search Report and Written Opinion", dated Feb. 3, 2017, 13 pages.
(Continued)

*Primary Examiner* — Kunal Langhnoja
(74) *Attorney, Agent, or Firm* — Kilpatrick Townsend & Stockton LLP (57) ABSTRACT

Described herein is a platform for providing a resource catalog local to an appliance device, such that the appliance device is able to generate a transaction related to one or more resources within the resource catalog. In some embodiments, the appliance device may receive resource information within streaming data. For example, the appliance device may receive an indication that a portion of streaming media data is related to a resource. Upon determining that a portion of streaming data is related to a resource, the appliance device may be configured to store the portion of data in relation to the identified resource. A user may retrieve and/or execute the portion of streaming data at a later date. In some embodiments, the user may request that a transaction be conducted with respect to the resource and a corresponding transaction request may be generated by the appliance device.

19 Claims, 5 Drawing Sheets

(51) Int. Cl.
*H04N 21/231* (2011.01)
*G06Q 30/06* (2012.01)
*H04L 47/70* (2022.01)
*H04L 9/40* (2022.01)

(52) U.S. Cl.
CPC ........ *H04L 47/826* (2013.01); *H04L 63/0807* (2013.01); *H04N 21/231* (2013.01)

(58) Field of Classification Search
CPC . H04L 67/16; H04L 65/4084; G06Q 30/0603; G06Q 30/0251; G06Q 50/10; G06Q 30/0601
See application file for complete search history.

(56) References Cited

U.S. PATENT DOCUMENTS

| | | | |
|---|---|---|---|
| 10,205,709 B2 | 2/2019 | John et al. | |
| 10,230,710 B2 | 3/2019 | Wang | |
| 10,356,057 B2 | 7/2019 | John et al. | |
| 10,387,146 B2 | 8/2019 | Sukhija et al. | |
| 10,397,215 B2 | 8/2019 | Kekicheff et al. | |
| 10,467,066 B2 | 11/2019 | Sukhija et al. | |
| 10,609,004 B2 | 3/2020 | Annam et al. | |
| 10,713,660 B2 | 7/2020 | Awasthi | |
| 10,776,513 B2 | 9/2020 | White | |
| 10,796,331 B2 | 10/2020 | White | |
| 10,839,361 B1 | 11/2020 | Pathiyal | |
| 10,866,709 B2 | 12/2020 | Chopra et al. | |
| 10,884,826 B2 | 1/2021 | Sukhija et al. | |
| 10,887,275 B2 | 1/2021 | Wang | |
| 10,915,899 B2 | 2/2021 | Lopez et al. | |
| 10,922,678 B2 | 2/2021 | Yeddula et al. | |
| 11,010,482 B2 | 5/2021 | Chen et al. | |
| 11,010,742 B2 | 5/2021 | Boncimino | |
| 11,025,613 B2 | 6/2021 | Kekicheff et al. | |
| 11,032,076 B2 | 6/2021 | Venkataraman | |
| 2002/0013950 A1* | 1/2002 | Tomsen ................ G06Q 10/10 725/109 | |
| 2003/0078987 A1 | 4/2003 | Serebrennikov | |
| 2004/0031058 A1 | 2/2004 | Reisman | |
| 2004/0117819 A1 | 6/2004 | Yu | |
| 2005/0114367 A1 | 5/2005 | Serebrennikov | |
| 2006/0112188 A1 | 5/2006 | Albanese et al. | |
| 2008/0098420 A1 | 4/2008 | Khivesara et al. | |
| 2008/0235090 A1 | 9/2008 | Lundstrom et al. | |
| 2009/0064266 A1 | 3/2009 | Wollmershauser et al. | |
| 2010/0162322 A1* | 6/2010 | Roberts ................. H04N 21/84 725/56 | |
| 2011/0307376 A1 | 12/2011 | Woxblom | |
| 2014/0081854 A1 | 3/2014 | Sanchez et al. | |
| 2015/0032627 A1* | 1/2015 | Dill ...................... G06Q 20/385 705/44 | |
| 2015/0178724 A1 | 6/2015 | Ngo et al. | |
| 2015/0244825 A1* | 8/2015 | Albanese ............... G06F 21/33 709/219 | |
| 2015/0269369 A1 | 9/2015 | Hamid | |
| 2016/0171479 A1 | 6/2016 | Prakash et al. | |

FOREIGN PATENT DOCUMENTS

| | | |
|---|---|---|
| KR | 20100012466 | 2/2010 |
| KR | 20100012466 | 12/2010 |
| KR | 101588238 | 1/2016 |
| RU | 2004115751 | 10/2005 |
| WO | 2008048738 | 4/2008 |

OTHER PUBLICATIONS

EP16901125.1 , "Extended European Search Report", dated Mar. 25, 2019, 10 pages.
PCT/US2016/030554 , "International Preliminary Report on Patentability", dated Nov. 15, 2018, 11 pages.
RU2018138396 , "Office Action", dated Nov. 18, 2019, 15 pages.
Application No. CN201680085295.4 , Office Action, dated Jul. 20, 2021, 22 pages with English Translation.
Application No. CN201680085295.4 , Office Action, dated Jan. 17, 2022, 26 pages.

* cited by examiner

PLATFORM FOR APPLIANCE BASED RESOURCE CATALOG

CROSS REFERENCE TO RELATED APPLICATIONS

This application is the US national stage of PCT/US2016/030554, filed May 3, 2016, the disclosure of which is incorporated herein by reference in its entirety.

BACKGROUND

Households typically include a number of appliances which provide users with access to a variety of information on various resources. In some cases, users are even able to make purchases (or complete other transactions) related to the resources using these appliances. However, even in these cases, information related to the resource must be retrieved from a computing entity (often via a network connection) before a transaction may be completed. This often results in several communications back and forth between a server and an appliance before a transaction can be initiated, resulting in a reduction of useable bandwidth for the appliance. This can be especially frustrating for a user attempting to use the appliance for its primary function at the same time that the appliance is attempting to conduct a transaction.

Embodiments of the invention address these and other problems, individually and collectively.

BRIEF SUMMARY

Embodiments of the invention are directed to a platform in which an appliance device locally stored resource information as it is received. In some embodiments, the resource information may be received as streaming data (e.g., streaming media files). The appliance device may identify a resource to which the resource information is related and/or determine that the resource information is to be stored based on an indicator associated with the resource information (e.g., metadata associated with the resource information that includes a resource identifier). Upon receiving input from a user, the appliance device may generate a transaction request related to the resource from the resource information received by the appliance device.

One embodiment of the invention is directed to a method performed by an appliance device comprising identifying information related to a resource within streaming data, determining, based on an indicator associated with the information related to the resource, that the information related to the resource is to be stored, and storing the information related to the resource in a resource catalog. The method further comprises receiving a request to conduct a transaction related to the resource, and generating, using the information related to the resource and an access token, a transaction request message. The method further comprises providing the generated transaction request message to a provider of the resource to initiate the transaction.

Another embodiment of the invention is directed to an appliance comprising a processor and a computer readable medium comprising a token module, a resource catalog, and a transaction module. The token module is configured to maintain at least one access credential. The resource catalog is configured to, as streaming data is received by the appliance, identify a portion of the streaming data related to a resource, compile a set of information for the resource from the identified portion of the streaming data, and store the compiled set of information. The transaction module is configured to receive a request related to the resource, generate, using the compiled set of information and the at least one access credential, a transaction request for the resource, and transmit the generated transaction request to a provider of the resource.

Another embodiment of the invention is directed to a server computer comprising one or more processors, and a memory including instructions that, when executed by the one or more processors, cause the one or more processors to receive, from a resource provider, a request to provide resource information to one or more appliances. The instructions further causing the one or more processors to provide the resource information to the one or more appliances within a streaming data, the resource information including an indication that the resource information is to be stored by the one or more appliances. The instructions further causing the one or more processors to receive a transaction request from an appliance of the one or more appliances, the transaction request related to a resource associated with the resource information, and initiate a transaction with the resource provider on behalf of a user of the appliance.

These and other embodiments of the invention are described in further detail below.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access credential" may be any data or portion of data used to gain access to a particular resource. In some embodiments, an access credential may be a login and/or password for a user account. In some embodiments, an access credential may be include account information or a token associated with the account information, a cryptogram, a digital certificate, etc.

An "appliance device" may be any suitable electronic device capable of communicating with, and/or interacting with other devices. An appliance device may have a primary function that is unrelated to communicating with other electronic devices. For example, an appliance device may be a refrigerator that, in addition to preserving food, is capable of interacting with one or more other electronic devices. In some embodiments, an appliance device may be associated with a device identifier. The device identifier may be used to determine the type of device for a particular appliance device. Examples of appliance devices may include gas and electric meters, refrigerators, lamps, thermostats, printers, automobiles, fire alarms, home medical devices, home alarms, motorcycles, boats, televisions, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a OW (card verification value), a dCW (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "media provider computer" may include a computing device capable of providing media content. In some embodiments, a media provider computer may provide content to one or more appliance devices. In some embodiments, the media provider computer may be a provider of streaming media content. For example, the media provider computer may be a provider of a streaming media service, such as a video streaming or webcam streaming service.

A "resource provider computer" may include a computing device capable of providing access to one or more resources. A resource provider computer may typically be an entity that engages in transactions and can sell goods or services, or provide access to goods or services. In some embodiments, the resource provider computer may be affiliated with an electronic marketplace or a retail entity that maintains an internet presence. A resource provider computer may support transactions to acquire resources (e.g., goods and/or services). The resource provider computer may be in communication with other devices via a network connection. Examples of resource provider computers may include computers maintained by merchants, data providers, etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Streaming media" may refer to any files provided to a computing entity in a continuous or semi-continuous stream of data. Streaming media may be used to refer to media files that are buffered and/or executed by the appliance device upon being accessed. In some embodiments, streaming media content may refer to a series of media files that are downloaded by an appliance device in a sequence. For example, a media provider may make a series of data files available and may provide an appliance device with the location (e.g., via a uniform resource locator (URL)) of each of the data files. In this example, the appliance device may access each of the data files at the indicated location in a specified order.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

Details of some embodiments of the present invention will now be described.

Figure 1:
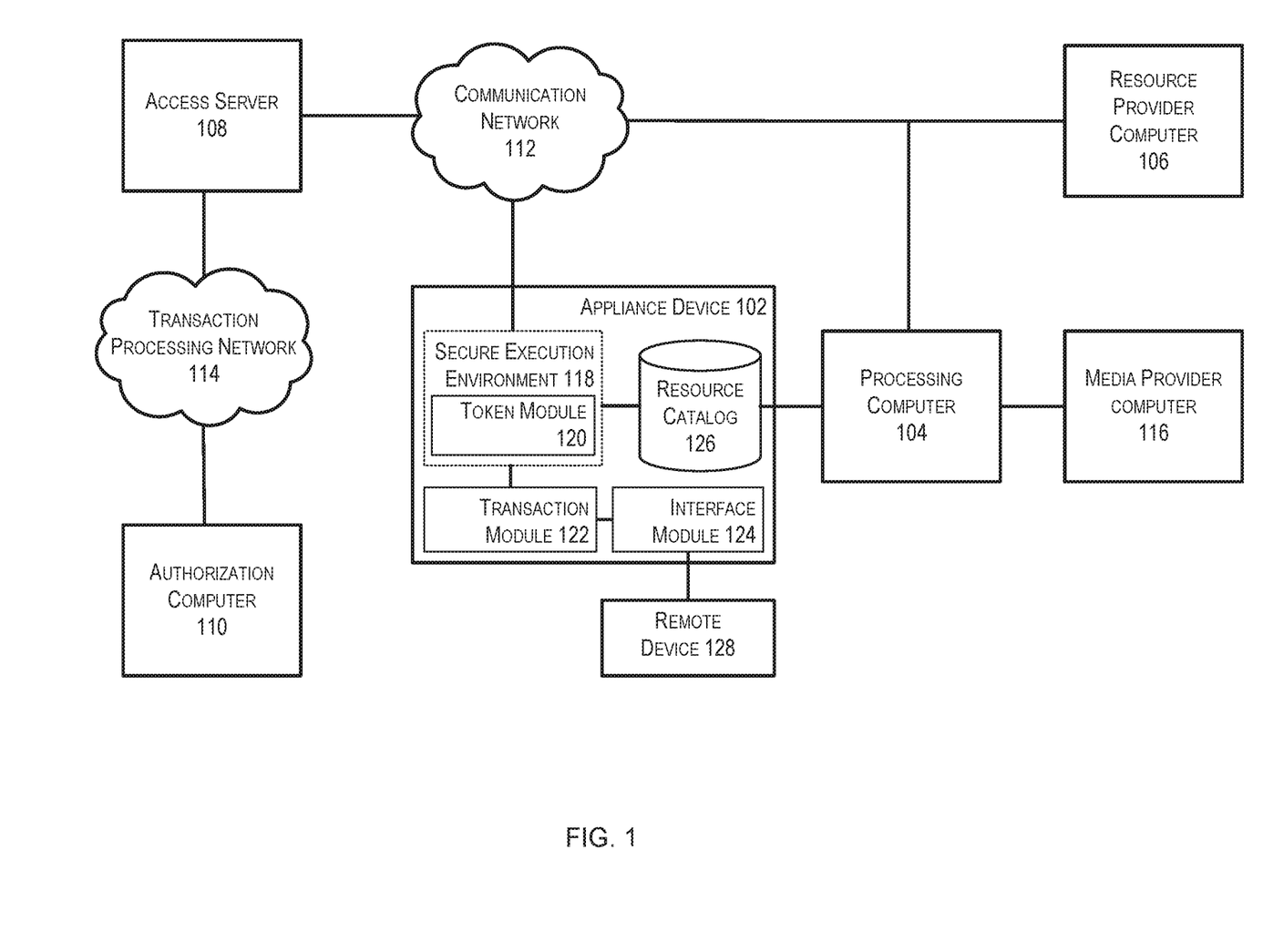
FIG. 1 depicts an example system architecture capable of implementing at least some embodiments of the current disclosure.

FIG. 1 depicts an example system architecture capable of implementing at least some embodiments of the current disclosure. In FIG. 1, an appliance device 102 is depicted as being in communication with a processing computer 104. Additionally, the appliance device 102 may be in communication with one or more of a resource provider computer 106, an access server 108, and/or an authorization computer 110 via a communication network 112 and/or a transaction processing network 114. In some embodiments, the appliance device 102 may receive streaming media content provided by a media provider computer 116.

An appliance device 102 may be may be any electronic device configured to perform at least one primary function. The appliance device 102 may include one or more processors and a memory that includes computer executable instructions to be executed by the one or more processors. In some embodiments, the memory may include a secure execution environment 118. The computer executable instructions may include one or more modules, such as a token module 120, a transaction module 122, and/or an interface module 124. In addition, the memory may include one or more data stores that store information to be processed by the modules, such as a resource catalog 126 that includes information related to one or more resources. This will be described in greater detail with respect to FIG. 2 below.

In accordance with at least some embodiments, the processing computer 104 may be any computing device, including a remotely located server computer, configured to perform one or more actions on behalf of the appliance device 102. Additionally, it should be noted that in some embodiments, the processing computer 104 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some embodiments, the processing computer 104 may be configured to provision information onto the appliance device 102. The processing computer 104 may provide any suitable service and/or processing for the appliance device 102. In some embodiments, the processing computer may maintain an account for one or more users and/or appliance device(s) 102. The processing computer may also store one or more policies and/or user preferences related to the operation of the appliance device 102 or service. In some embodiments, the processing computer may be configured to provide an indication of which media content is to be stored by the appliance device 102.

A resource provider computer 106 may be any computing device or plurality of computing devices configured to provide access to a resource. In some embodiments, the resource provider computer 106 may be associated with an electronic commerce site. For example, the resource provider computer 106 may maintain a catalog of items and/or services available for purchase by a user. The resource provider computer 106 may also be associated with a merchant website or an acquirer. In some embodiments, the resource provider computer 106 may enable a user to gain entry to a secure area or storage unit.

In accordance with at least some embodiments, the access server 108 may be any computing device or plurality of computing devices configured to initiate a transaction on behalf of a resource provider, such as a merchant. In some embodiments, the access server 108 may be configured to complete a transaction upon receiving an authorization response message indicating that a transaction has been approved. In some embodiments, the access server 108 may be operated by an acquirer or a financial institution associated with a resource provider computer 106.

In accordance with at least some embodiments, the authorization computer 110 may be any computing device or plurality of computing devices configured to receive an authorization request message for a transaction, authorize or decline the transaction, and provide an authorization response message based on whether the transaction has been authorized or declined. The authorization computer 110 may determine whether to authorize or decline the transaction based on information associated with the transaction. In some embodiments, the authorization computer 110 may be operated by an issuer of a payment account (e.g., a credit card).

In some examples, the communication network 112 and/or the transaction processing network 114 may include any one or a combination of many different types of networks, such as cable networks, the Internet, wireless networks, cellular networks, and other private and/or public networks. In addition, the communication network 112 and/or transaction processing network 114 may comprise multiple different networks. For example, the appliance device 102 may utilize a 3G network to communicate with a wireless router, which may then route the communication over a public network (e.g., the Internet) to the resource provider computer 106. In some embodiments, the transaction processing network 114 may be a payment processing network (e.g., VisaNet).

In accordance with at least some embodiments, the media provider computer 116 may be any computing device or plurality of computing devices configured to provide media content to the appliance device 102. In some embodiments, the media provider computer 116 may be operated by a provider of streaming media content. In the context of this disclosure, streaming media content may refer to media files that are provided in a continuous or semi-continuous stream of data. In some embodiments, streaming media content may refer to a series of media files that are downloaded by the appliance device 102 is a sequence. For example, the media provider computer 116 may make a series of data files available and may provide the appliance device 102 with the location (e.g., via a uniform resource locator (URL)) of each of the data files. In this example, the appliance device 102 may access each of the data files at the indicated location in a specified order. In some embodiments, the media files may be buffered and/or executed by the appliance device 102 upon being accessed.

A remote device 128 may be any electronic device configured to enable remote user interaction with an appliance device 102. In some embodiments, the remote device 128 may be a remote control associated with the appliance device 102. In some embodiments, the remote device 128 may be a cellular phone or other mobile device capable of communicating user input to the appliance device. In some embodiments, the remote device 128 may be configured to interact with an interface module 124 of the appliance device 102. In some embodiments, the interface module 124 may comprise a graphical user interface (GUI) or other means of presenting data to the user, such that the appliance device 102 may be configured to present feedback to the user in response to receiving user input via the remote device 128.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
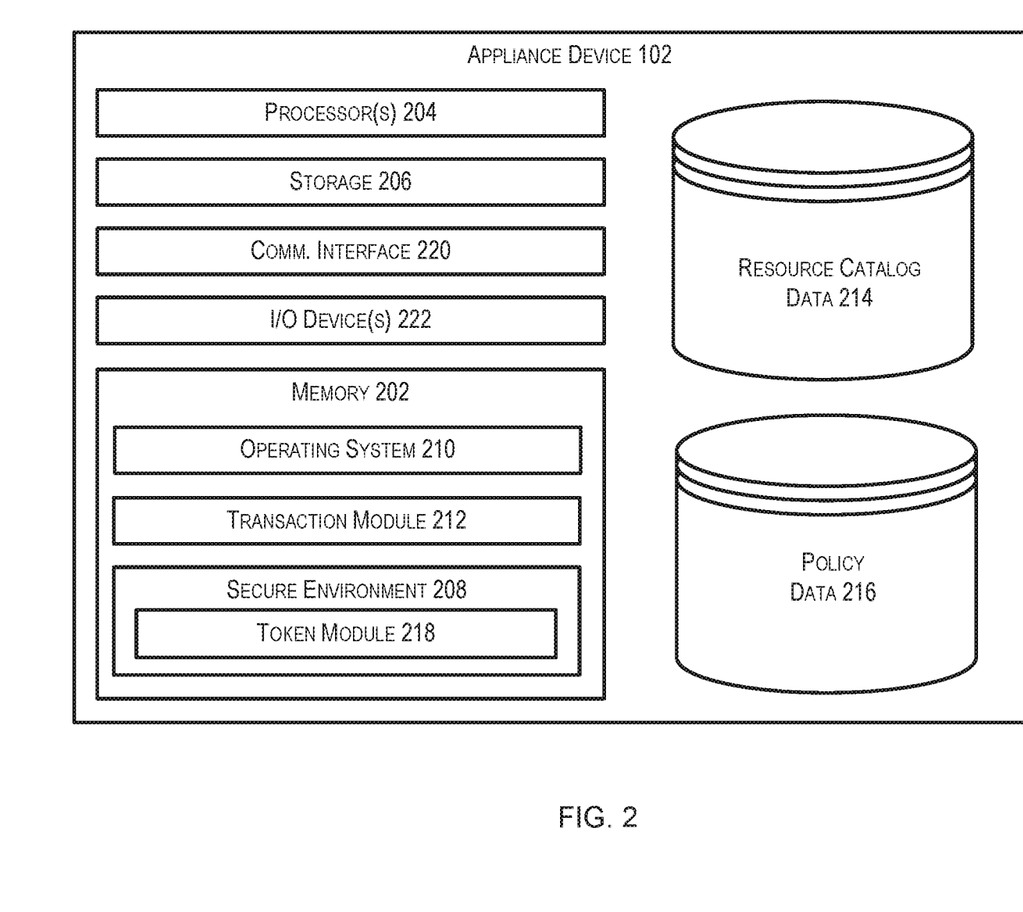
FIG. 2 depicts an example appliance device configured to store resource information in a resource catalog and generate transaction request messages related to a resource in accordance with at least some embodiments.

FIG. 2 depicts an example appliance device configured to store resource information in a resource catalog and generate transaction request messages related to a resource in accordance with at least some embodiments. The appliance device 102 may be an example appliance device 102 of FIG. 1.

The appliance device 102 may be any type of computing device capable of receiving media content, identifying resource information within the media content, storing the identified resource information, and generating transaction request messages. In at least some embodiments, the appliance device 102 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of appliance device 102, the memory 202 may be volatile (such as random access memory (RAM)) and/or non-volatile (such as read-only memory (ROM), flash memory, etc.). The appliance device 102 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the appliance device 102. In some embodiments, the memory 202 may include multiple different types of memory, such as static random access memory (SRAM), dynamic random access memory (DRAM) or ROM.

The memory 202 of appliance device 102 may include a secure execution environment 208 such as a secure memory (e.g., Smartcard based technology available in low-power devices). In some embodiments, the secure execution environment 208 may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities.

Turning to the contents of the memory 202 in more detail, the memory 202 may include an operating system 210 and one or more application programs or services for implementing the features disclosed herein including at least a module for generating transaction requests related to an identified resource to initiate a transaction (transaction module 212). The memory 202 may also include resource catalog data 214, which provides data associated with one or more resources and policy data 216, which provides information on policies to be applied to transactions initiated by the appliance device 102.

In some embodiments, the transaction module 212 may, in conjunction with the processor 204, be configured to determine whether a requested transaction is in compliance with one or more policies related to the transaction and/or the appliance device 102. For example, the transaction module 212 may be programmed to cause the appliance device 102 to identify one or more policies relevant to a resource and/or type of resource associated with a requested transaction. In some embodiments, policies may be identified based on a transaction amount, the type of resource to which the transaction request is related, an amount of the transaction, or any other suitable factor.

The transaction module 212 may also be configured to cause the processor 204 to identify a token or other access credential to be associated with a transaction and to generate a transaction request message in accordance with at least some embodiments. For example, upon receiving an indication of a resource to be obtained, the appliance device 102 may determine a resource provider computer associated with the resource, identify a token to be used to obtain the resource, and may generate a transaction request to be provided to the resource provider computer and/or access server to initiate a transaction for the requested resource. In this example, upon determining that the transaction is in compliance with each of the relevant policies, the appliance device may generate the transaction request to include an identifier and quantity of a resource and an access credential, which may then be provided to the resource provider computer to initiate the transaction.

In some embodiments, at least some information provisioned by a processing computer onto the appliance device 102 may be stored in the secure memory. The appliance device 102 may include secure key storage to protect data at rest and encryption keys (i.e. a shared secret). The encryption keys could be unique-derived keys (UDKs), which can be derived from user account information and other unique information. A benefit to using UDKs is that the UDKs do not need to be transported to the devices that use them, but they can be generated by those devices using information known to those devices. The appliance device 102 may also store instructions for communicating with other devices and/or instructions for initiating a payment transaction. In some embodiments, the secure execution environment 208 may include at least a module for managing information related to access credentials (token module 218). The secure execution environment may also include one or more secure data stores for storing any sensitive information (e.g., access credential, encryption keys, etc.).

The appliance device 102 may also contain communications interface(s) 218 that enable the appliance device 102 to communicate with a stored database, another computing device or server, one or more remote devices, other appliance devices, and/or any other suitable electronic devices. In some embodiments, the communication interface 218 may enable the appliance device 102 to communicate with other electronic devices on a network (e.g., on a private network). The appliance device 102 may also include input/output (I/O) device(s) and/or ports 220, such as for enabling connection with a keyboard, a mouse, a pen, a voice input device, a touch input device, a display, speakers, a printer, etc.

Figure 3:
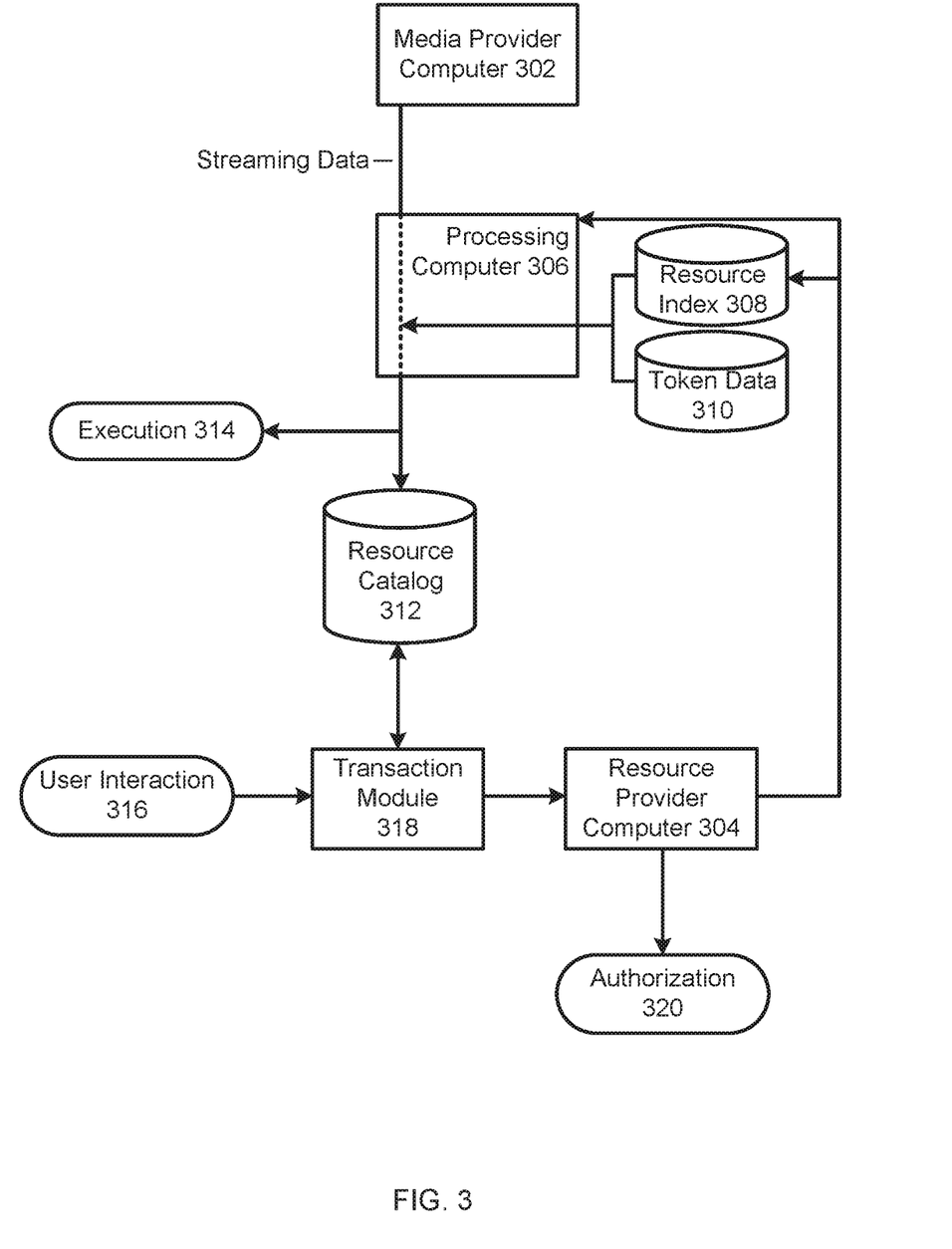
FIG. 3 depicts an example data flow that may be implemented in accordance with at least some embodiments.

FIG. 3 depicts an example data flow that may be implemented in accordance with at least some embodiments. The data flow depicted in FIG. 3, may be implemented at least by the example architecture depicted in FIG. 1.

In accordance with at least some embodiments, streaming data may be provided by a media provider computer 302. In some embodiments, the streaming data may be provided as a series of sequential files (files provided in an ordered sequence), or portions of a single media file. In some embodiments, the streaming data may comprise files located on a server which are "streamed" by providing a location of the files to another computing entity that subsequently downloads the files from the server.

During an enrollment phase, a resource provider computer 304 may communicate with the processing computer

306. During the enrollment, the resource provider computer 304 may provide the processing computer 306 with information related to a resource that it provides. For example, the resource provider computer may provide information related to an availability (e.g., a time period during which the resource is available), a price, a lifespan, or any other suitable resource-related information. The processing computer 306 may normalize the received information (place the information into a standard format) and store the information as a record in a resource index. The processing computer 306 may provide a resource identifier to the resource provider computer 304 that may be used to identify the record related to the resource in the resource index.

The streaming data may be accessed by the processing computer 306.

In some embodiments, at least a portion of the streaming data may be identified as being associated with an indication of a resource (e.g., one or more files from the series of files that comprise the streaming data). The processing computer 304 may determine that one or more provided files is associated with a resource identifier. For example, the one or more files may be associated with metadata that includes the resource identifier. In some embodiments, upon determining that the one or more files are associated with the resource identifier, the processing computer 306 may reference the resource index 308 to generate a resource file related to the resource identifier. The resource file may be provided to a resource catalog 312 located on an appliance device with an indication that it is related to the one or more files determined to be associated with the resource identifier when the one or more files are received. In some embodiments, the resource file may comprise information related to acquisition of the resource. For example, the resource file may include the price of the resource, contact information for the resource provider computer (e.g., a URL), or any other suitable information needed to complete a transaction with the resource provider for the resource. In some embodiments, the resource file may be associated with an expiration date and/or time. For example, a resource file may be set to expire upon reaching the end of a sale related to the resource. In another example, the resource file may be set to expire upon reaching the end of a period of time for which the resource provider has paid to enroll its resource. The one or more files associated with the resource file may be stored in the resource catalog in relation to the resource file.

In accordance with at least some embodiments, the processing computer 306 may also be configured to manage and provide access credential information to an appliance device. In some embodiments, the processing computer 306 may identify one or more access credentials that may be used to gain access to the resource from the resource provider computer 304. For example, the resource provider computer 304 may provide an indication of acceptable payment mechanisms from which the resource provider computer 304 is able to receive payment. In some embodiments, the processing computer 306 may generate a token or subtoken specific to the resource, resource provider, and/or the appliance device. The token may be stored by the processing computer 306 in token data 310. The token may be included in the resource file provided to, and stored in, the resource catalog 312 of the appliance device.

In some embodiments, the one or more files may be executed by the appliance device at 314. For example, in addition to being stored in the resource catalog 312 along with a resource file, the portion of streaming data may be presented to a user of the appliance device at the time that it is received.

In some embodiments, the appliance device may receive a user interaction 316 related to the resource. A transaction module 318 of the appliance device may in conjunction with a processor in the application device cause the appliance device to identify a resource file associated with the resource based on the user interaction 316. In some embodiments, the transaction module 318 may be an example transaction module 212 depicted in FIG. 2. In response to receiving, via the user interaction 316, a request to obtain the resource associated with the resource file, the transaction module 318 may be configured to generate a transaction request message. The transaction request message may include an indication of the resource, a quantity, a shipping address, an authorized transaction amount, or any other suitable information necessary to complete the transaction. In addition, the transaction message may include a token or other access credential that may be used to complete the transaction.

The generated transaction message may be provided to a resource provider computer 304 to initiate a transaction related to the resource. The resource provider computer 304 may, upon receiving the transaction message, determine an availability for the resource. Upon determining that the resource is available, the resource provider computer 304 may initiate authorization 320 for the transaction by generating an authorization request message to be provided to an authorization computer associated with the token. In some embodiments, the resource provider computer 304 may provide a response to the transaction module 318 to indicate whether the transaction has successfully been initiated.

More specifically, although the authorization 320 may occur in any suitable manner, in some embodiments of the invention and referring to FIG. 1, the resource provider computer 106 may generate the authorization request message, which may be transmitted to the authorization computer 110 via the communication network 112, the access server 108, and the transaction processing network 114. The authorization computer 110 may generate an authorization response message which may be returned to the resource provider computer 106 through the transaction processing network 114, the access server 108, and the communication network 112. At the end of the day or at some other suitable period of time, a settlement process may occur between the access computer 108 and the authorization computer 110.

If a token was present in the authorization request message instead of a real payment credential, then the real credential (e.g., a real PAN) may be determined from the token by a token vault (not shown in FIG. 1), which may be in operative communication with any of the access server 108, the transaction processing network 114, and/or the authorization computer 110.

By way of illustrative example, consider the following exemplary scenario. An advertiser (an example of a resource provider that operates the resource provider computer 304) may enroll an advertised product with a provider of the disclosed service (the provider may operate the processing computer 306). In some embodiments, the processing computer 306 may be operated by the media provider. In some embodiments, the processing computer 306 may be operated by a server that provides backend support for a resource catalog implemented on the appliance device. In this scenario, the advertiser may provide product information for the advertised product (e.g., availability, price, shipping costs, etc.) and may be provided with a resource identifier in return. The advertiser may then provide a video advertisement for the product to a streaming video provider computer (an example media provider computer 302) to be embedded in streaming video content. In this scenario, the video advertisement may include an indication of the resource identifier. The streaming video provider may stream video to one or more smart televisions (an example appliance device) that includes the video advertisement. Upon detecting that the video advertisement is related to the resource identifier (e.g., a metadata associated with the video advertisement includes the resource identifier), a smart television that receives the video advertisement may be provided with a resource file related to the video advertisement. In addition to playing the video advertisement, the smart television may store both the resource file and the video advertisement in a resource catalog 312.

In this illustrative scenario, a user may be provided with the ability to view or otherwise select the video advertisements stored in the resource catalog 312. If the user selects an option to purchase the advertised product, the smart television is able to generate a purchase order (an example transaction message) for the advertised product. In some cases, the purchase order may include all of the information necessary to complete the purchase of the advertised product. The purchase order may then be provided to the provider of the disclosed service or directly to the advertiser (e.g., at a URL indicated in the resource file via a network connection). The purchase may then be initiated by the advertiser by submitting an authorization request message to an issuer of a payment instrument provided in the purchase order. Upon receiving an approved authorization response, the advertiser may initiate a fulfillment process to provider the product to a user of the smart television.

Figure 4:
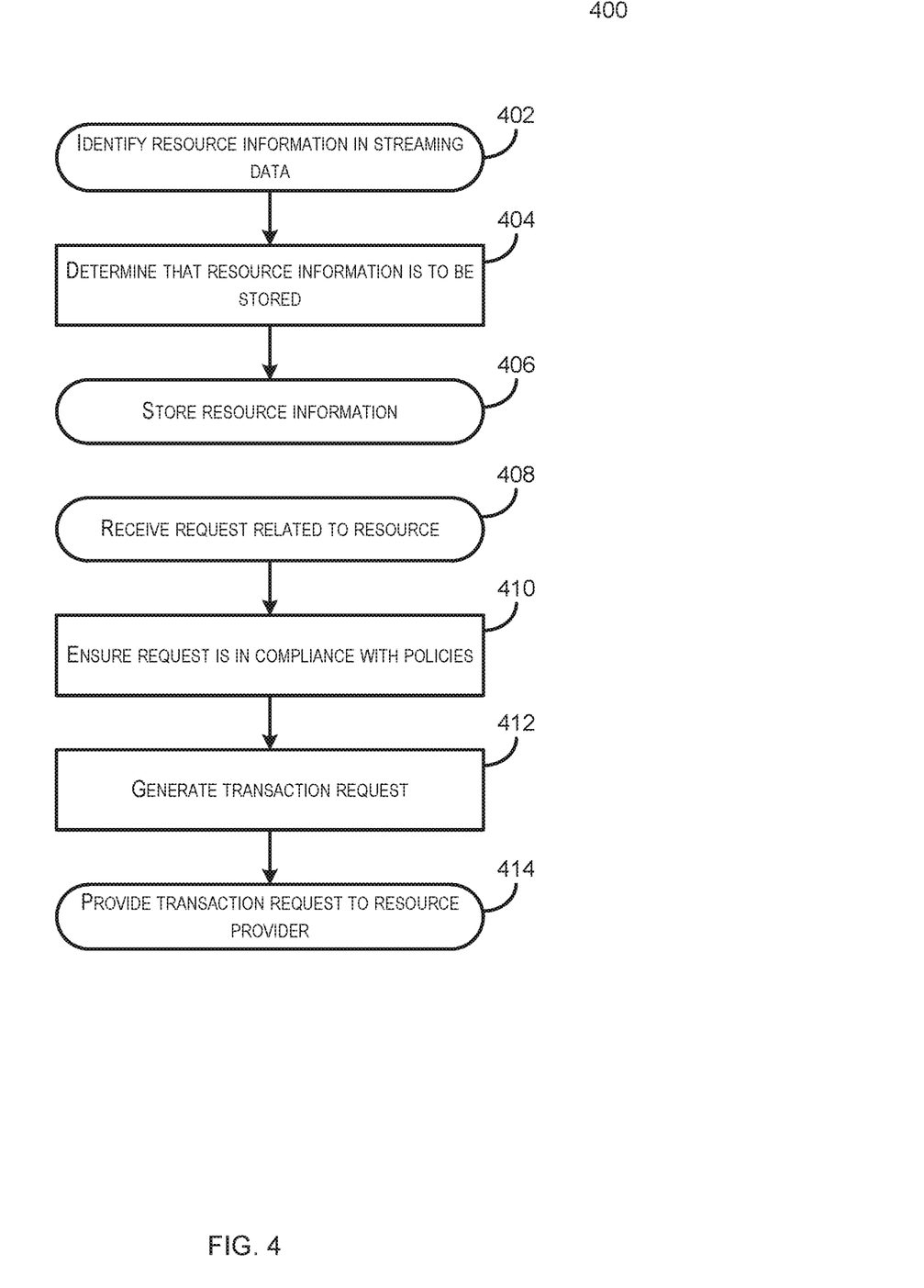
FIG. 4 depicts a flow diagram illustrating a process for receiving resource information and subsequently conducting transactions in accordance with at least some embodiments.

FIG. 4 depicts a flow diagram illustrating a process for receiving resource information and subsequently conducting transactions in accordance with at least some embodiments.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the appliance device 102 depicted in FIG. 1 and FIG. 2. The code may be stored on a computer-readable storage medium, for example, in the form of a computer program including a plurality of instructions executable by one or more processors. The computer-readable storage medium may be non-transitory.

Process 400 may begin at 402, when streaming data (or a portion thereof) is identified as being related to a resource. In some embodiments, the portion of data may be identified as being related to a resource by a resource identifier located within metadata associated with the portion of streaming data. In some embodiments, the portion of streaming data may comprise a series of data files. For example, a thirty-second video related to a resource may be inserted into a longer video that is unrelated to the resource. The thirty-second video may be stored on a server as 15 consecutive data files, each containing two seconds of video. In this example, all 15 of the data files may include metadata with the resource identifier, indicating that they are each related to the resource. As the appliance receives the streaming data, it may play, or otherwise execute, each file received in the streaming data. As the 15 consecutive files are received and executed by the appliance, they may be identified as being related to the resource.

At 404, an appliance device may determine whether to store the identified portion of data. In some embodiments, an identified portion of data may be stored upon determining that the portion of data is related to an active (e.g., non-expired) resource identifier. In some embodiments, a user may indicate one or more interests. For example, the user may provide an indication of a type of resource for which a related portion of data should be stored. In this example, a resource identifier may include an indication of a category or type associated with the resource and the resource information may be stored if it is related to a category or type that the user has indicated. In some embodiments, a user may actively indicate an interest. For example, the user may select one or more user preference settings. In some embodiments, the user may inactively indicate an interest. For example, the user may perform a search for a particular resource or view a television show related to a resource.

At 406, upon determining that the resource information is to be stored, the appliance device may store the resource information in a resource catalog database. Information related to one or more resource may subsequently be accessed in the resource catalog by the appliance device. For example, in some embodiments, a user may request information related to a resource, and the appliance device may query the resource catalog for one or more records related to the indicated resource. In some embodiments, the user may specify a type of resource and information may be accessed in the resource catalog for multiple resources of the specified resource type.

By way of illustration, consider the scenario in which an advertiser (i.e., the resource provider) provides a video advertisement (i.e., the resource information) to a content distributor (i.e., the processing computer) to be distributed to one or more appliance devices. For the purposes of this scenario, assume that the streaming content is video content and the advertisement is a video advertisement for a product offered by the advertiser. The distributor may attach metadata to the advertisement that indicates the resource identifier, a product being advertised, a price, the advertiser, or any other suitable information. The advertisement may then be embedded into a television program distributed to a smart television.

The smart television, upon receiving the advertisement, may determine that the advertisement is related to the product based on the attached metadata, and may subsequently store the advertisement (and metadata) in a resource catalog upon determining that the resource identifier in the metadata is valid. In this scenario, the smart television may store advertisements related to particular products. For example, the user of the smart television may indicate (e.g., via a webpage or user preferences) that he or she is interested in seeing advertisements related to golf clubs. In this example, advertisements related to golf clubs may be stored by the smart television. In some cases, the user may not explicitly state a product preference. For example, the user may watch a lot of golf on the smart television and the smart television may deduce from the user's behavior that the user is interested in golf clubs. The advertisements stored by the smart television, in addition to being played at the time they are received, may be played at a later time upon request by the user.

In some embodiments, the received resource information may be executed upon detecting that one or more conditions have been met. For example, in some embodiments, the appliance device may determine that a type of the resource indicated in the resource information is related to one or more files currently being executed upon the appliance device. In this example, one or more processors of the appliance device may select a media file stored in relation to the resource information and may execute the selected media file. For example, the appliance device may have stored an advertisement for golf clubs (resource information). In this example, the appliance device may determine that it is currently streaming content related to golf (e.g., video of a golf tournament). Upon making this determination, the appliance device may select and play the advertisement for golf clubs based on the determination that golf clubs are related to golf.

At 408, the appliance device may receive a request to conduct a transaction related to the resource. For example, a user of the appliance may provide user input that indicates a desire to purchase the resource. Upon receiving the request, the appliance may query information relevant to the resource from the resource catalog. For example, the appliance may retrieve and execute the portion of streaming data stored in relation to the resource. Upon receiving a purchase command from the user, the appliance may identify the resource provider associated with the resource from the resource catalog in order to initiate a transaction.

At 410, the appliance device may ensure that the transaction is in compliance with one or more policies. For example, the appliance may confirm that the transaction is within a range of indicated acceptable transaction amounts. In some embodiments, the appliance device may require that a user enter a pin code, password, or other suitable authentication before initiating the transaction. One or more policies may be provisioned onto the appliance device by a processing computer. In some embodiments, a user may select one or more policies to be associated with his or her account and those policies may be provisioned onto the appliance device via a network connection.

At 412, upon determining that the requested transaction is in compliance with each relevant policy, the appliance may generate a transaction request. In some embodiments, a transaction request may include an indication of an amount of the resource requested, a shipping address, and an access credential (e.g., a token) to be used to complete the transaction. In some embodiments, the appliance device may receive an encryption key from the resource provider computer (e.g., the encryption key may be stored in a resource file). The transaction request may be encrypted using the encryption key, such that it may be accessed only by the resource provider computer or another computing entity in possession of the corresponding decryption key.

At 414, the appliance may provide the generated transaction request to a resource provider computer to initiate the transaction. In some embodiments, the appliance device may transmit the generated transaction request to the resource provider computer via the network connection. In some embodiments, the appliance device may transmit the transaction request to a processing computer, which may subsequently initiate a transaction with the resource provider computer on behalf of the appliance device.

Continuing with the example scenario described above, in which an advertiser provides a video advertisement to a content distributor, a user may request to view a particular advertisement or type of advertisement stored in the resource catalog. A smart television may play the requested advertisements upon identifying them. The user may be given the ability to indicate that he or she would like to purchase a product advertised in one of the advertisements. The smart television may ensure that the user is authorized to initiate a transaction for the requested product. Upon determining that the user is authorized to purchase the requested product, the smart television may generate a transaction request for the advertised product. The generated transaction request may be provided to the advertiser or it may be provided to the content distributor, which may forward the request (or a portion thereof) to the advertiser.

Figure 5:
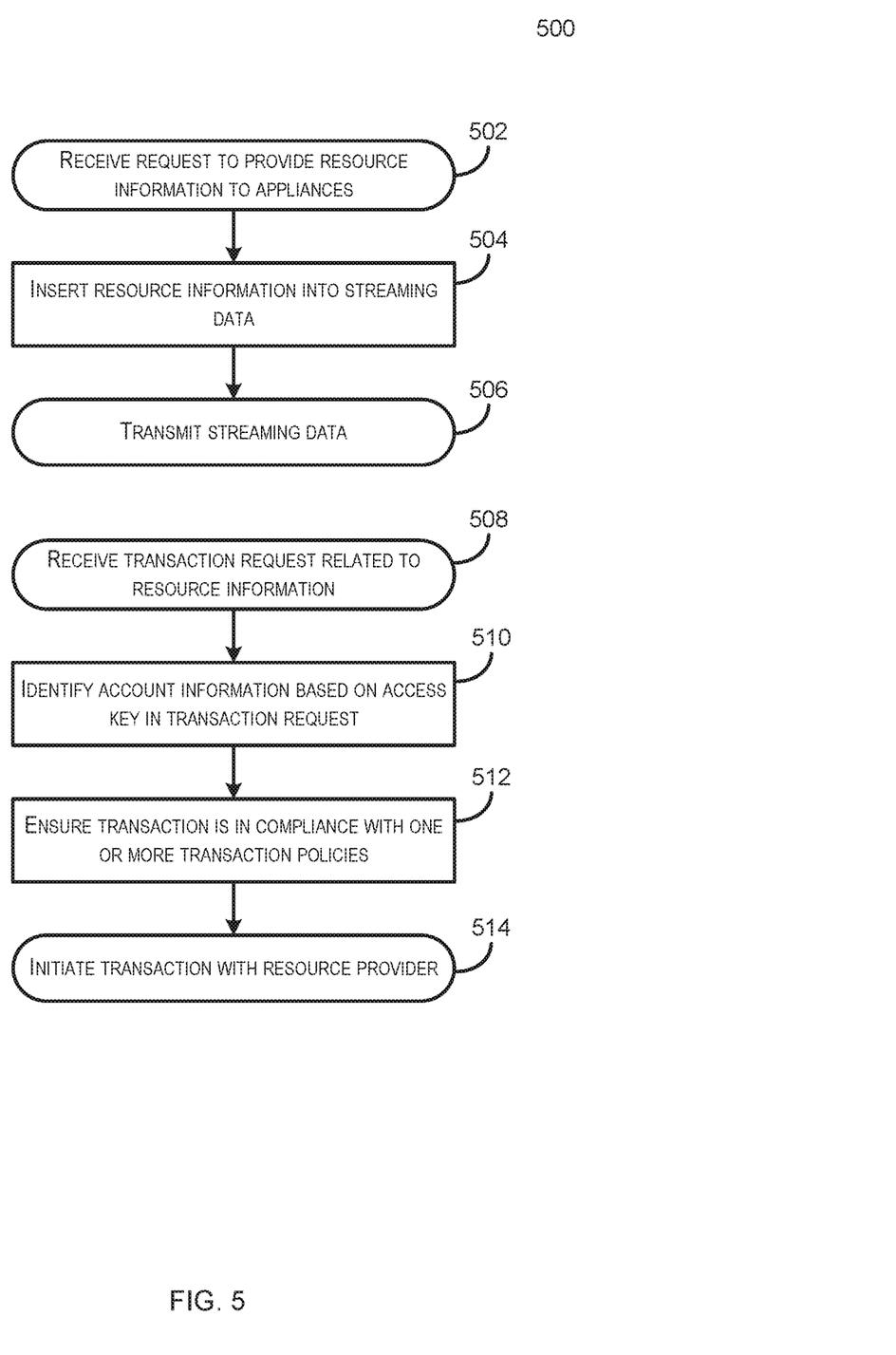
FIG. 5 depicts a flow diagram illustrating a process for enrolling resource providers and subsequently conducting transactions in accordance with at least some embodiments.

FIG. 5 depicts a flow diagram illustrating a process for enrolling resource providers and subsequently conducting transactions in accordance with at least some embodiments.

In accordance with at least one embodiment, the process 500 of FIG. 5 may be performed by at least the processing computer 104 depicted in FIG. 1. The code may be stored on a computer-readable storage medium, for example, in the form of a computer program including a plurality of instructions executable by one or more processors. The computer-readable storage medium may be non-transitory.

Process 500 may begin at 502, when a request is received from a resource provider computer to provide information related to a resource (e.g., a product) to one or more appliance devices. The request may include various details related to the resource. For example, the request may include an availability, a type of the resource, a price for the resource, information related to a special offer for the resource, or any other suitable resource-related information. In some embodiments, the request may include an indication of an expiration date for an offer associated with the resource. In some embodiments, the request may include an indication of the types of users and/or appliance devices that should be provided with the resource information. For example, the request may include demographic information that includes an indication of a range of ages and/or income levels for users that should be provided with the resource information. In response to receiving the request, the processing computer may generate a record for the resource in a resource index. In some embodiments, the processing computer may generate a resource file to be provided to one or more appliance devices.

At 504, the resource information may be embedded into streaming data. For example, the resource information may comprise an advertisement or other offer related to the resource. In this example, the streaming data may be a video file, and the offer related to the resource may be embedded into the video file.

At 506, the streaming data may be provided to one or more appliance devices. In the example above, the video file with the embedded resource information may be provided to a number of televisions or other appliance devices suitable for viewing of video files.

At 508, the processing computer may receive a transaction request related to the resource. The transaction request may include an indication of the appliance device to which the transaction request is related. In some embodiments, the received request may include a resource identifier that can be used to identify the resource within a resource index.

At 510, the processing computer may identify account information to be used to complete the transaction based on an access credential provided in the transaction request. In some embodiments, the processing computer may be a token server and the access credential may be a token used to identify a payment account.

At 512, the processing computer may ensure that the transaction is in compliance with one or more policies. For example, the processing computer may confirm that the transaction is within a range of indicated acceptable transaction amounts. In some embodiments, the processing computer may provide a challenge/response related to the transaction.

At 514, upon determining that the requested transaction is in compliance with the policies, the processing computer may initiate the requested transaction. In some embodiments, the processing computer may generate a second transaction request that includes the identified account information. The second transaction request may be provided to at least one of the resource provider computer and/or an authorization computer. For example, in some embodiments, the second transaction request may be an authorization request message to be provided to an authorization computer.

By way of illustrative example, consider the scenario in which an advertiser (i.e., the resource provider) provides an advertisement to a content distributor (i.e., the processing computer) to be distributed to one or more appliance devices. For the purposes of this scenario, assume that the streaming content is video content and the advertisement is a video advertisement for a product offered by the advertiser. The distributor may attach metadata to the advertisement that indicates the resource identifier, a product being advertised, a price, the advertiser, or any other suitable information. The advertisement may then be embedded into a television program distributed to multiple smart televisions.

Continuing with this illustrative example, the content distributor may receive a transaction request related to the advertised product at a later point in time. For example, a user may have elected to purchase the advertised product from a smart television and a transaction request may have subsequently been generated by the smart television for the advertised product. The transaction request may be received at the content distributor and checked to make sure that it is in compliance with various transaction policies. The content distributor may then query a database for the resource identifier included in the transaction request to identify the advertiser and/or a network address at which the advertiser can be contacted. The transaction request may then be forwarded to the advertiser to initiate a transaction for the advertised product. It should be noted that although the illustrative scenario describes the content distributor receiving the transaction request, the transaction request may instead be provided to the advertiser directly.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable a user to quickly and securely initiate a transaction for a resource. The user is able to view information related to resources that has been provided to an appliance (such as a smart television) and generate a purchase order using information stored on the appliance.

In some embodiments, the invention includes the use of a subtoken generated for a specific appliance device and resource, such that the subtoken can only be used by the specified appliance to conduct a transaction for the specified resource. This prevents potentially fraudulent use of access credentials that may be intercepted by an unauthorized third party. Additionally, by generating a transaction request on an appliance device, all of the payment processing and marketplace/rewards calculations can be performed without resorting to a remote computer. This reduces back and forth communications between the remote computer and the appliance device, and subsequently reduced bandwidth used. Additionally, this disclosure allows each appliance to process any payments/marketplace transactions in a manner that is specific to that appliance device. This is particularly useful in an Internet of Things (IOT) environment, where machines are conducting transactions with different machines in a variety of different situations.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of policies, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g.

a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An appliance comprising:
a processor; and
a computer readable medium comprising:
(a) a token module executable by the processor to store at least one payment token, wherein the token module is executable in a secure execution environment and the at least one payment token is a series of characters that is a substitute for an original payment account identifier;
(b) a resource catalog executable by the processor to:
as streaming data is received by the appliance, identify a portion of the streaming data related to a resource by identifying a resource identifier included within metadata of the portion of the streaming data;
identify that the resource identifier relates to a category of resources to be stored, wherein the category includes one or more resources specified by a user based on one or more preferences stored in relation to the user of the appliance;
upon determining that the resource belongs to the category of resources to be stored, compile a set of information for the resource from the identified portion of the streaming data, the compiled set of information comprising at least the resource identifier, a price of the resource and a network address for a resource provider associated with the resource; and
store, at a storage module of the appliance, the compiled set of information; and
(c) a transaction module executable by the processor to:
receive a request related to the resource;
generate, using at least a portion of the data included in the compiled set of information and the at least one payment token, a transaction request associated with a transaction for the resource, wherein the transaction request includes the at least one payment token; and
transmit the transaction request to the resource provider via the network address of the resource provider, wherein the resource provider processes the transaction using the at least one payment token.

2. The appliance of claim 1, wherein the transaction module is further executable by the processor to ensure that the request related to the resource is in compliance with one or more stored transaction policies prior to generating the transaction request.

3. The appliance of claim 1, wherein the identified portion of the streaming data includes an indication for contacting the resource provider, and the transaction module is further executable by the processor to transmit the generated transaction request to the resource provider using indicated means.

4. The appliance of claim 1, wherein the identified portion of the streaming data includes an expiration date associated with the resource, and the resource catalog is further configured to delete the compiled set of information upon exceeding the expiration date.

5. The appliance of claim 1, wherein the appliance is a smart television.

6. A method comprising:
identifying, within streaming data by an appliance, a portion of the streaming data related to a resource by identifying a resource identifier included within metadata of the portion of the streaming data;
determining, by the appliance, based on an indicator associated with information related to the resource, that the information related to the resource is to be stored by:
identifying that the resource identifier relates to a category of resources to be stored, wherein the category includes one or more resources specified by a user based on one or more preferences stored in relation to the user of the appliance; and
upon determining that the resource belongs to the category of resources to be stored, compiling a set of information for the resource from the identified portion of the streaming data, the compiled set of information comprising at least the resource identifier, a price of the resource and a network address for a resource provider associated with the resource;
storing, by a storage module of the appliance, the compiled set of information related to the resource in association with the category of resources within a resource catalog residing on the appliance;
receiving, by the appliance, a request to conduct a transaction related to the resource;
generating, by the appliance, using at least a portion of the data included in the compiled set of information related to the resource and an access token stored in a token module of the appliance, a transaction request message, wherein the access token comprising a payment token including a series of characters that is a substitute for an original payment account identifier, wherein the transaction request message includes the payment token; and
transmitting, by the appliance, the transaction request message to the resource provider via the network address of the resource provider, wherein the resource provider processes the transaction using the payment token.

7. The method of claim 6, wherein the streaming data is a series of media files.

8. The method of claim 7, wherein the series of media files are made available for download at a network location.

9. The method of claim 7, wherein the indicator associated with the information related to the resource comprises metadata associated with a subset of the series of media files.

10. The method of claim 6, wherein the information related to the resource is an offer for the resource.

11. The method of claim 6, further comprising:
receiving a request for information related to the resource;
retrieving a file associated with the information related to the resource; and
executing the file to convey the requested information related to the resource to a user that submitted the request.

12. The method of claim 11, wherein the requested information related to the resource is conveyed to the user on a display device of the appliance.

13. A server computer comprising:
one or more processors; and
a memory including instructions that, when executed by the one or more processors, cause the one or more processors to:
receive, from a resource provider computer, a request to provide resource information to one or more appliances;
identify a portion of the resource information related to a resource by identifying a resource identifier included within metadata of the portion of the resource information;

identify that the resource identifier relates to a category of resources to be stored, wherein the category includes one or more resources specified by a user based on one or more preferences stored in relation to the user of the one or more appliances;

determine that the resource belongs to the category of resources to be stored;

upon determining that the resource belongs to the category of resources to be stored, compile a set of information for the resource from the portion of the resource information related to the resource, the compiled set of information comprising at least the resource identifier, a price of the resource and a network address for a resource provider associated with the resource, the compiled set of information stored at a storage module of the one or more appliances;

provide the resource information to the one or more appliances within a streaming data, the resource information including an indication that the resource information is to be stored by the one or more appliances;

receive a transaction request from an appliance of the one or more appliances, the transaction request related to the resource associated with the resource information, wherein the transaction request includes at least a portion of the data included in the compiled set of information and at least one payment token, the at least one payment token stored in a token module of the appliance, wherein the at least one payment token includes a series of characters that is a substitute for an original payment account identifier; and initiate, based on the received transaction request, a transaction with the resource provider computer on behalf of the user of the appliance using the compiled set of information and the at least one payment token, wherein the resource provider processes the transaction using the at least one payment token.

14. The server computer of claim 13, wherein the transaction request is a request to gain access to the resource.

15. The server computer of claim 13, wherein the transaction request includes an access credential associated with the user of the appliance, and the instructions further cause the one or more processors to identify a payment account associated with the access credential.

16. The server computer of claim 15, wherein initiating the transaction with the resource provider computer on behalf of a user of the appliance comprises:

generating a request that includes at least an indication of the resource and the payment account; and providing the generated request to the resource provider computer at a network location.

17. The server computer of claim 13, wherein the instructions further cause the one or more processors to, in response to receiving the request to provide resource information to one or more appliances, generating a record to be stored in a resource index maintained by the server computer.

18. The server computer of claim 17, wherein the instructions further cause the one or more processors to generate a resource file from the record, and wherein the resource information provided to the one or more appliances includes the generated resource file.

19. The server computer of claim 18, wherein the indication that the resource information is to be stored by the one or more appliances is the resource file.

* * * * *